US007079319B2

(12) United States Patent
Helbing

(10) Patent No.: US 7,079,319 B2
(45) Date of Patent: Jul. 18, 2006

(54) OPTICAL SIGNAL CONTROL DEVICE AND METHOD FOR UTILIZING SAME

(76) Inventor: Rene Helbing, 848 Sycmore Dr., Pal Alto, CA (US) 94303

( * ) Notice: Subject to any disclaimer, the term of this patent is extended or adjusted under 35 U.S.C. 154(b) by 498 days.

(21) Appl. No.: 10/071,356

(22) Filed: Feb. 8, 2002

(65) Prior Publication Data

US 2003/0151811 A1 Aug. 14, 2003

(51) Int. Cl.
G02B 27/28 (2006.01)
G02B 5/30 (2006.01)
(52) U.S. Cl. .............. 359/484; 359/494; 359/496; 359/497; 385/11; 385/18
(58) Field of Classification Search ........ 359/494–497, 359/483–485; 385/17, 11, 18
See application file for complete search history.

(56) References Cited

U.S. PATENT DOCUMENTS

| 3,781,736 A * | 12/1973 | Parker | 335/304 |
| 4,799,768 A * | 1/1989 | Gahan | 350/279 |
| 5,930,422 A * | 7/1999 | Cheng | 385/47 |
| 6,181,846 B1 * | 1/2001 | Pan | 385/18 |
| 6,360,034 B1 * | 3/2002 | Chang | 385/18 |
| 6,795,245 B1 * | 9/2004 | Xiao | 359/495 |
| 6,944,363 B1 * | 9/2005 | Li et al. | 385/16 |

FOREIGN PATENT DOCUMENTS

JP 2000056399 A * 2/2000

* cited by examiner

Primary Examiner—Leonidas Boutsikaris

(57) ABSTRACT

An optical device that receives polarization components of input light, spatially separates the polarization components, provides the polarization components with a angles of polarization and directs them onto a reflective element that has a plurality of states. The spatially-separated polarization components are incident on the reflective element with a incident angles of polarization and are reflected by the reflective element with a spatial separation and reflected angles of polarization, which may or may not be the same as the incident angles of polarization. The angles of polarization of the reflected light are a function of the state of the reflective element. The portion of light reflected by the reflective element and the direction in which the reflected light propagates through the optical device can be controlled by controlling the state of the reflective element. The spatially-separated polarization components of the reflected light are combined into output-light polarization components that are at least partially spatially coincident and out-coupled from the optical device. The optical device can be used for various purposes, such as, for example, as a 2-by-2 switch, as an optical attenuator, as a variable beam splitter, for drop-and-continue functionality, etc.

24 Claims, 5 Drawing Sheets

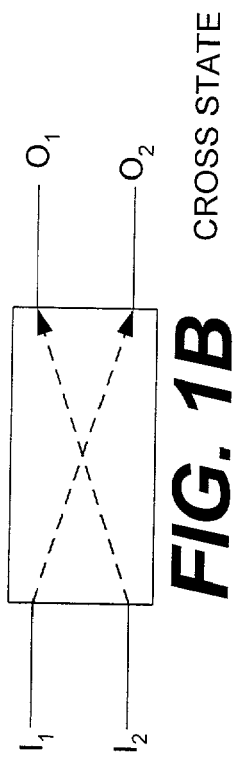
FIG. 1B CROSS STATE
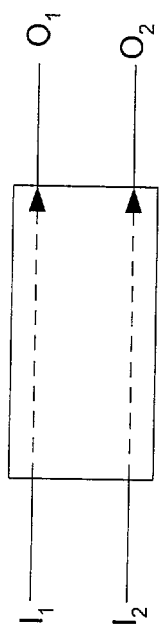
FIG. 1A BAR STATE top view side view

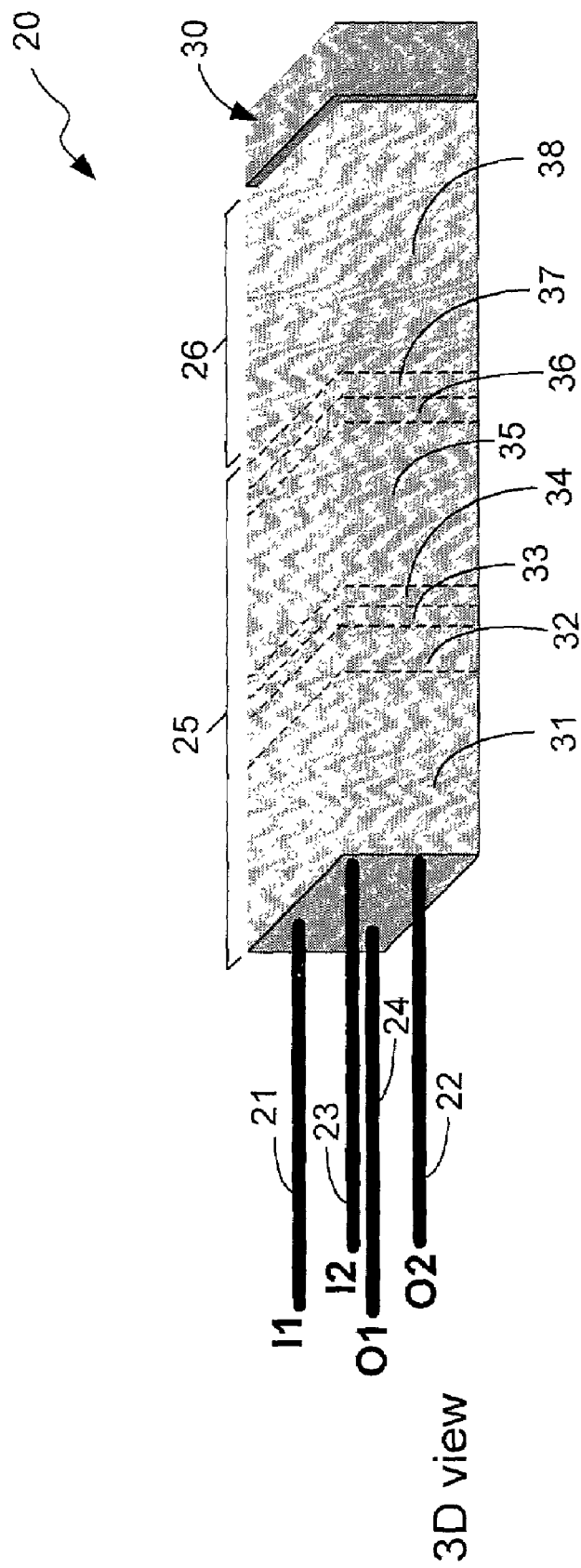

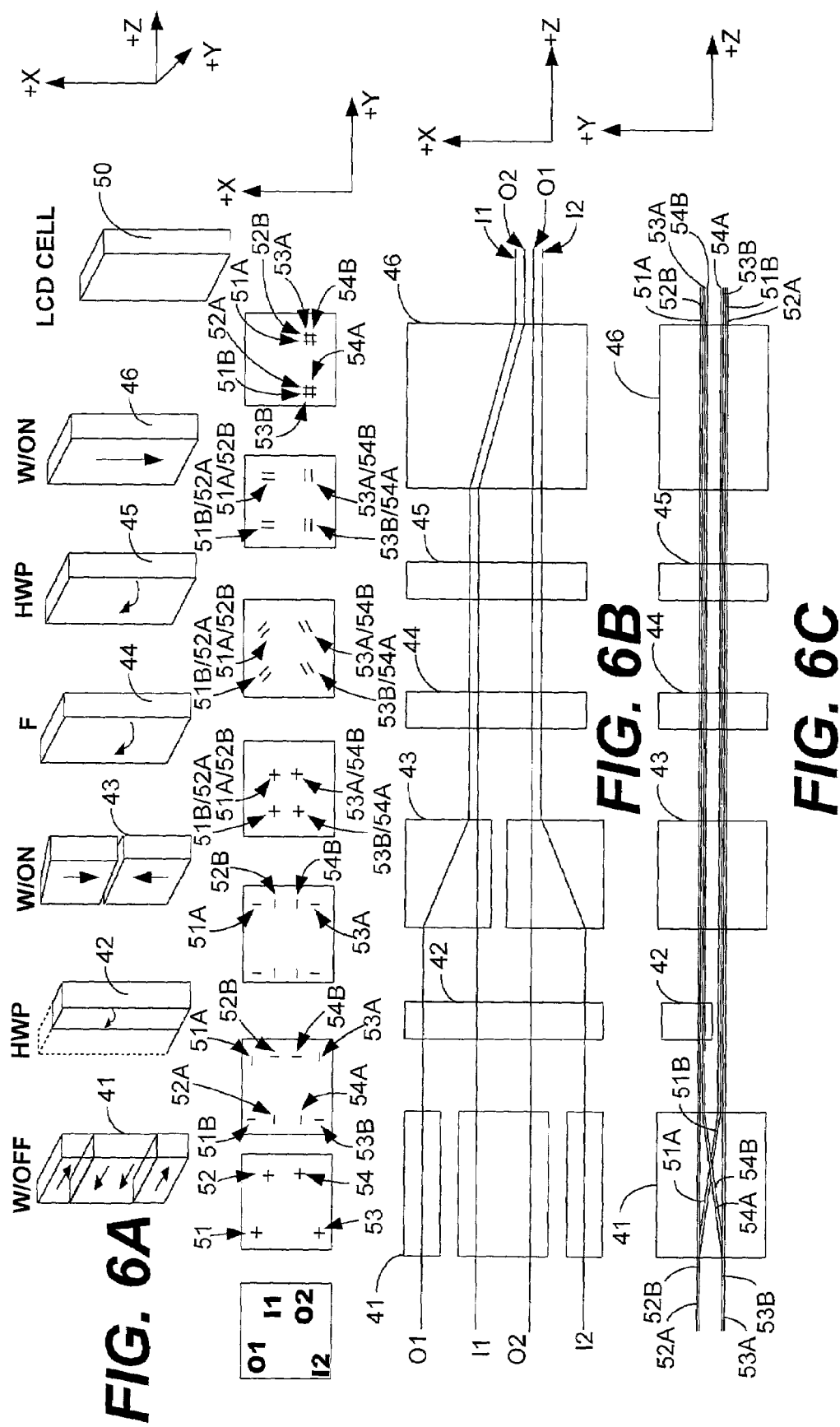

OPTICAL SIGNAL CONTROL DEVICE AND METHOD FOR UTILIZING SAME

BACKGROUND OF THE INVENTION

The present invention relates to an optical signal control device that may be used for purposes such as, for example, optical switching (an optical 2-by-2 switch), optical variable attenuation and optical variable beam splitting, although the present invention is not limited to these particular uses. The optical devices provided by the present invention do not require, although they may include, moving parts, and are more reliable, less expensive and less bulky than other types of optical devices, such as opto-mechanical switches, for example.

Optical switches are used for a variety of purposes. A 2-by-2 optical switch has two states, namely, a "cross state" and a "bar state". A 2-by-2 switch in the bar state is shown in FIG. 1A. A 2-by-2 switch in the cross state is shown in FIG. 1B. Some 2-by-2 switches are opto-mechanical in design and include mirrors that are physically moved to cause the switch to go from the bar state shown in FIG. 1A to the cross state shown in FIG. 1B, and vice versa. Sometimes the mirrors become fixed in a certain position, which can prevent the switch from changing state. Also, such switches may not need to be switched from one state to the other for very long periods of time (e.g., many years) once they have been installed. This lack of use may cause the mirrors to become fixed in one state simply due to lack of movement. Consequently, opto-mechanical switches tend to be somewhat unreliable. They also are bulky because they use relatively large optical and mechanical components, which causes these switches to consume a large amount of space.

Optical 2-by-2 switches do exist that do not rely on movable parts, but they tend to be susceptible to optical cross talk. Accordingly, a need exists for optical signal control devices, such as 2-by-2 optical switches, for example, that do not exhibit much, if any, optical cross-talk and insertion loss, that do not require movable components and that are less bulky than other types of optical signal control devices.

SUMMARY OF THE INVENTION

The present invention provides an optical signal control device that receives at least one input light beam, spatially separates the polarization components of the light beam, and provides the polarization components with incident angles of polarization before they are incident on a controllable reflective element that has a plurality of states. The spatially-separated polarization components are reflected by the reflective element with a spatial separation and angles of polarization that are the same or different from the incident angles of polarization. The angles of polarization of the reflected-light polarization components are a function of the state of the reflective element. The light reflected by the reflective element has one or more particular paths of propagation through the optical device that can be controlled by controlling the state of the reflective element. At least a portion of the reflected light propagating through the optical device is out-coupled from the optical device.

The optical device can be used for various purposes, such as, for example, as a 2-by-2 switch, as a variable optical attenuator, as a variable beam splitter, for drop-and-continue functionality, etc. For example, if the optical device is configured with a first input, a first output, a second input and a second output, the state of the reflective element can be chosen to switch the 2-by-2 switch from the bar state to the cross state, and vice versa. When the reflective element is placed in a first state, the light from the first input is directed to the first output and light from the second input is directed to the second output. When the reflective element is placed in a second state, the light from the first input is directed to the second output and light from the second input is directed to the first output. Because of the manner in which the polarization components of the light are manipulated within the optical device, and because of the ability to control the states of the reflective element, optical cross-talk and insertion loss can be minimized or eliminated. Furthermore, because the optical device preferably is fully integrated, no moving parts are required to perform any type of switching action, drop-and-continue functionality, optical attenuation, etc.

These and other features and advantages of the present invention will become apparent from the following description, drawings and claims.

BRIEF DESCRIPTION OF THE DRAWINGS

FIGS. 1A and 1B are block diagrams of 2-by-2 switches in the bar state and cross state, respectively.

FIG. 4 is a perspective view of the optical device of the present invention configured in a particular manner using particular components and materials.

FIG. 6A is a polarization diagram demonstrating another embodiment that utilizes a different configuration of components and the manner in which the components perform particular polarization functions to enable 2-by-2 optical switching, optical attenuation, optical beam splitting, etc., to be performed.

FIG. 6B is a top view of the optical device of the present invention shown in FIG. 6A.

FIG. 6C is a side view of the optical device of the present invention shown in FIG. 6A.

DETAILED DESCRIPTION OF THE PREFERRED EMBODIMENTS

The present invention provides an integrated optical device that is based on a reflective element, which preferably is a liquid crystal cell. Because the integrated optical device of the present invention is well suited for use as a 2-by-2 optical switch, it will be described with respect to that particular application. However, as discussed in more detail below the optical device of the present invention can be used for many purposes other than optical switching, such as, for example, for optical attenuation. Those skilled in the art will understand the manner in which the optical device of the present invention can be used for other purposes from the discussion of the device in the context of a 2-by-2 switch. Therefore, the following discussion refers to the optical device of the present invention as a switch, but this is merely for the purpose of providing an example and demonstrating the concepts and principles of the present invention.

Figure 2:
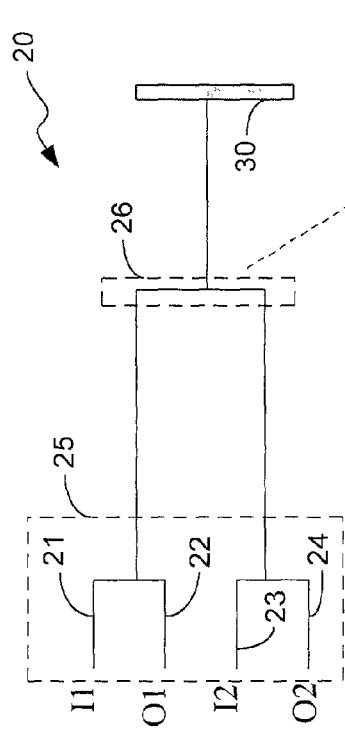
FIG. 2 is a schematic diagram of the optical device of the present invention in accordance with one embodiment.

An example design of the integrated optical device of the present invention in accordance with one embodiment is shown in FIGS. 2–5. FIG. 2 is a schematic diagram of the 2-by-2 optical switch 20 of the present invention. The switch 20 comprises four pigtailed ports, $I_1$, $O_1$, and $O_2$, which are represented by numerals 21, 22, 23 and 24, respectively, a directional stage 25, a polarization stage 26 and a reflective element 30 having a plurality of states, which preferably is a liquid crystal (LC) cell 30.

Each of the ports 21, 22, 23 and 24 is configured to receive and end of an optical fiber (not shown). The device 20 can be viewed as having a 2-stage separation in a tree-like structure. In the stage represented by the dashed box 25, the light entering input ports $I_1$ and $I_2$ is split into separate polarization beams that are then operated on by various optical components to provide them with a particular polarization. Since the direction of the light is used to define the positions of the light paths $I_1$ and $O_1$ and $I_2$ and $O_2$, respectively, the stage 25 will be referred to herein as the directional stage. In the stage represented by dashed box 26, the path of the light depends on the polarization of the light on the incoming light paths $I_1$ and $I_2$ and outgoing paths $O_1$ and $O_2$. Therefore, stage 26 will be referred to herein as the polarization stage because it directs the light based on its polarization. For the input beams, the polarization of the light propagating through the stage 26 depends on its origin (whether it originated in stage 25A or 25B). In this direction, the stage 26 acts as a polarization beam combiner. For the output beams, the polarization of the light depends on the state of the reflective element 30, which determines how the light will be operated on by the polarization stage, as discussed below in detail. In this propagation direction, stage 26 acts as a polarization beam splitter.

Along the output paths $O_1$ and $O_2$, the light reflected by the reflective element 30 will be operated on by the polarization stage 26 based on the polarization of the reflected light. As the light passes through the polarization stage 26, it is given an initial direction based on its polarization, which depends on the state of the reflective element and the polarization of the incident light. Based on this initial direction, the directional stage 25 will direct the light along the appropriate output path $O_1$ and/or $O_2$ and ultimately combine the respective polarization components on each respective output path on one respective fiber.

In order to implement the directional stage 25, preferably walk-off crystals, faraday rotators and half waveplates are utilized to accomplish light path separation based on direction. These components are selected and combined in such a way that the light from either of the input ports $I_1$ 21 and $I_2$ 23 that is reflected by the LC cell 30 can only enter the output ports $O_1$ 22 and/or $O_2$ 24. In order to implement the polarization stage 26, a polarization beamsplitter, a wollaston prism, or a walk-off crystal, for example, is used to combine the polarizations of the light from the input light paths and separate the polarization of the reflected light in a particular manner to cause either (1) switching to occur through rotation of the polarization of the LC cell 30 or (2) switching not to occur (i.e., light from $I_1$ goes to $O_1$ and light from $I_2$ goes to $O_2$). The manner in which these components are implemented to accomplish these tasks will be described below in detail with reference to FIG. 5.

Figure 3A:
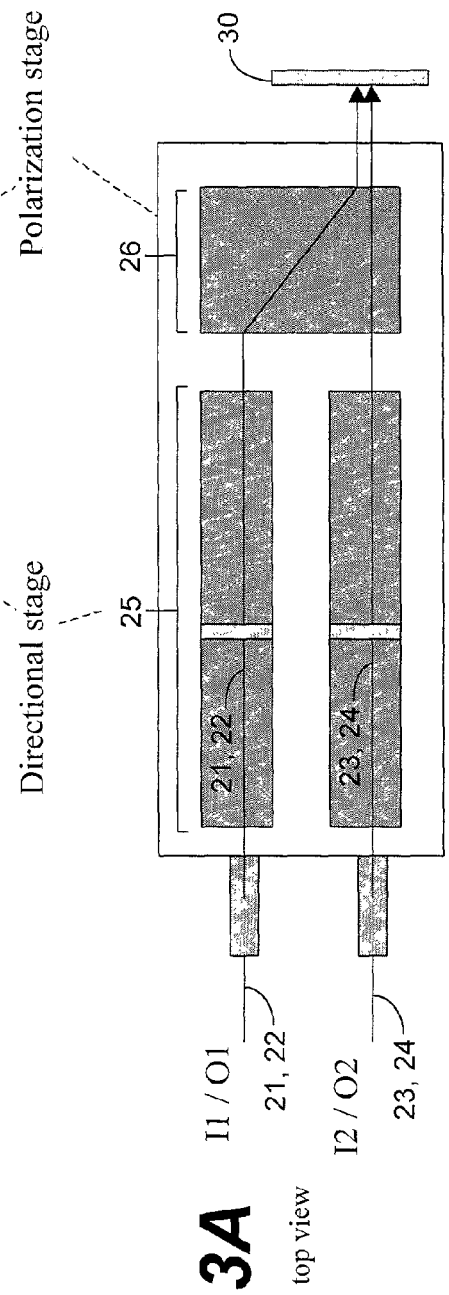
FIG. 3A is a top view of the optical device of the present invention shown in FIG. 2.
Figure 3B:
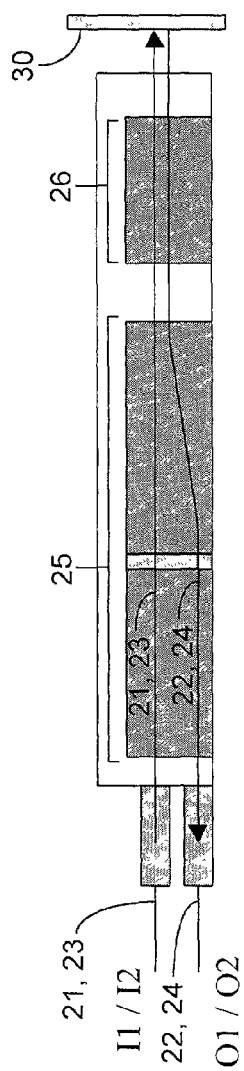
FIG. 3B is a side view of the optical device of the present invention shown in FIG. 2.

A top view and a side view of the integrated optical device 20 are shown in FIG. 3A and FIG. 3B, respectively. With reference to the top view of FIG. 3A, the $I_1$ 21 and $O_1$ 22 light paths remain in the same vertical planes over the course of those light paths through the device 20. Therefore, both light paths, although spatially separated, are represented by the single line labeled 21, 22. Similarly, the $I_2$ 23 and $O_2$ 24 light paths are in the same vertical planes with respect to the top view of FIG. 3A over the course of those light paths through the device 20. Therefore, both of those light paths, although spatially separated, are also represented by the single line labeled 23, 24.

In FIG. 3B, the light paths $I_1$ 21 and $I_2$ 23 are in the same transverse planes over the course of those light paths through the device 20 with respect to the side view. Therefore, both light paths, although spatially separated, are represented by the single line labeled 21, 23. Similarly, the $O_1$ 22 and $O_2$ 24 light paths are in the same transverse planes with respect to the side view of FIG. 3B over the course of those light paths through the device 20. Therefore, both of those light paths, although spatially separated, are represented by the single line labeled 22, 24.

The liquid crystal (LC) cell 30 controls the configuration of the device 20 to change from the bar state to the cross state, and vice versa. If the LC cell 30 rotates the polarization 90°, light on light path $I_1$ 21 will be reflected by the LC cell 30 onto light path $O_2$ 24 and light on light path $I_2$ 23 will be reflected by the LC cell 30 onto light path $O_1$. When the LC cell does not rotate the polarization of the light incident on it, light on path $I_1$ 21 will be reflected by the LC cell 30 onto light path $O_1$ 22 and light on light path $I_2$ 23 will be reflected by the LC cell 30 onto light path $O_2$ 24. Rotation of the polarization of the LC cell 30 by angles other than 90° will produce other results that are useful for other purposes, as discussed below in more detail.

FIG. 4 illustrates a perspective view of the complete, fully-integrated package, including the four pigtailed ports $I_1$ 21, $I_2$ 23, $O_1$ 22 and $O_2$ 24. The directional stage 25 is comprised of a first walk-off element (WO1) 31, a compensation element (Comp) 32, a first Faraday rotator (F1) 33, a first half-waveplate (HWP1) 34, a second walk-off element (WO2) 35, a second Faraday rotator (F2) 36 and a second half-waveplate (HWP2) 37. The polarization stage 26 comprises a polarization combining and separating stage, which may be, for example, a third walk-off element (WO3) 38. The manner in which these components operate in conjunction with one another to accomplish the switching action of the switch 20 can be seen in FIG. 5.

Figure 5:
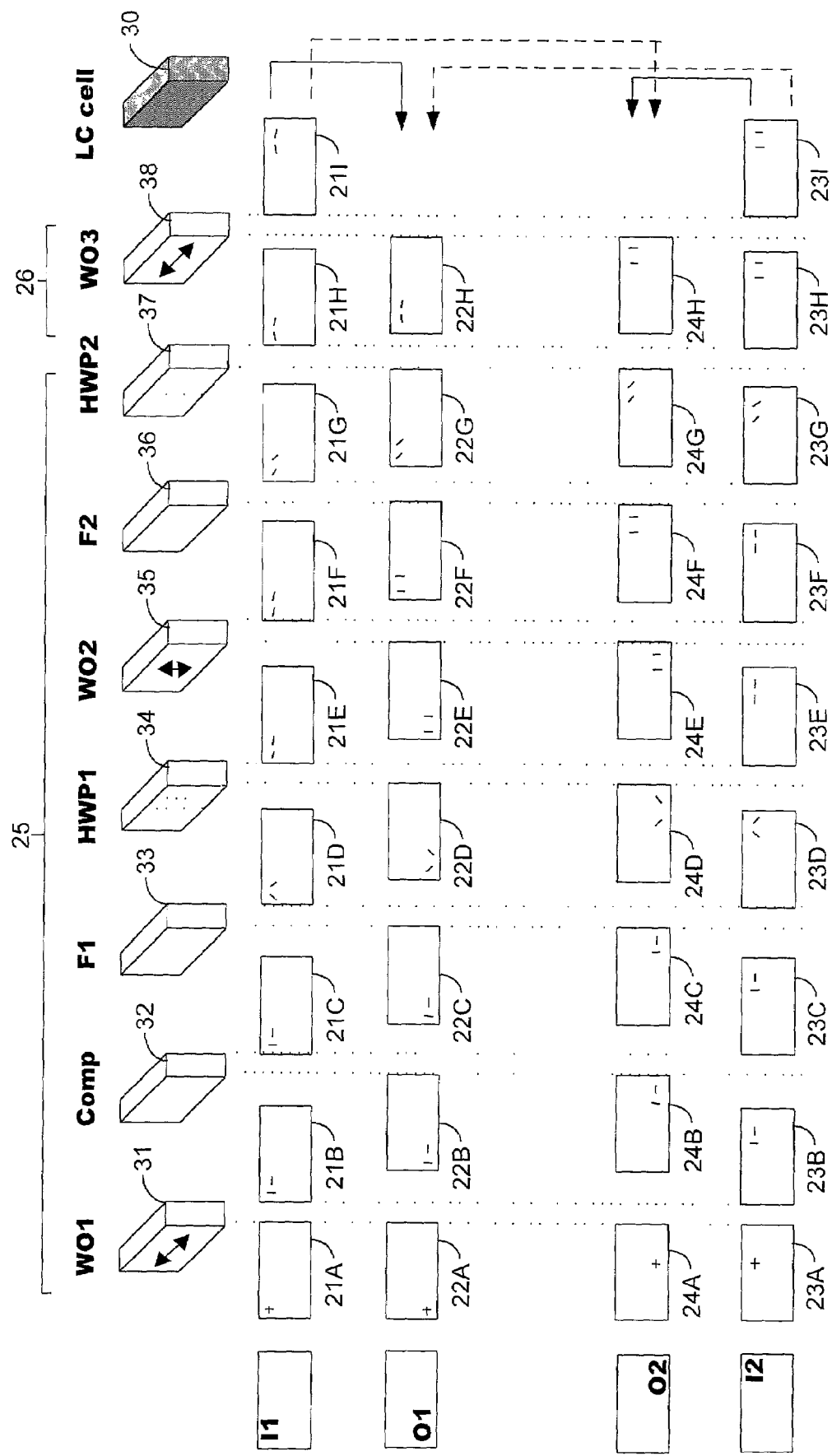
FIG. 5 is a polarization diagram demonstrating the manner in which the components shown in FIG. 4 perform particular polarization functions to enable 2-by-2 optical switching, optical attenuation, optical beam splitting, etc., to be performed.

FIG. 5 shows the polarization of each of the components 31–38 for each of the light paths 21–24. The blocks 21A–21I show the polarization of each of the components 31–38 and LC cell 30, respectively, along light path $I_1$ 21. The blocks 22A–22H show the polarization of each of the components 31–38, respectively, along light path $O_1$ 22. The blocks 24A–24H show the polarization of each of the components 31–38, respectively, along light path $O_2$ 24. The blocks 23A–23I show the polarization of each of the components 31–38 and LC cell 30, respectively, along light path $I_2$ 23.

Light that enters the input ports $I_1$ 21 and $I_2$ 23 will have a polarization vector that can be resolved into two orthogonal polarization components. Likewise, light exiting output ports $O_1$ 22 and $O_2$ 24 will have a polarization vector that corresponds to the combination of the two orthogonal polarization components. Essentially, the polarization vector of the respective light signals entering a respective input port is initially resolved into two separate orthogonal polarization components, walked-off in particular directions, and rotated in particular manners so that the light signals from these ports that impinge on the LC cell 30 will be reflected by it into either output port $O_1$ 22, output port $O_2$ 24, or into both output ports $O_1$ 22 and $O_2$ 24. However, the arrangement is such that none, or substantially none, of the light from one of the input ports $I_1$ or $I_2$ is reflected back into one of the input ports. Also, the polarization components of each of the respective polarization vectors of each of the respective signals will be combined before exiting the output ports $O_1$ and/or $O_2$. Therefore, whereas respective input paths of the directional stage 25 separate the respective polarization vectors into separate polarization components and operate on them in a particular manner, the output paths of the directional stage 25 operate on the respective reflected, separated polarization components in a particular manner and combine the respective polarization components into respective polarization vectors.

The waveplates 31, 34 and 37 may be made of quartz, which is a material typically used to produce waveplates. The walk-off elements 31, 35 and 38 may be made of yttrium vanadate or of a rutile material, for example. A walk-off crystal has a polarization direction defined by its crystal structure. The Faraday rotators 33 and 36 may be made of garnet, for example. Faraday rotators rotate light polarization through the application of a magnetic field. The Faraday rotators can be "latched" Faraday rotators. Latched Faraday rotators will continue to rotate light through magnetization even after the magnetic field is no longer being applied to the latched Faraday rotator. Alternatively, a magnet may be embedded in the integrated optic device 20 adjacent to or in close proximity to the Faraday rotator to enable the necessary magnetic field to be generated.

These components are known in the art and the manner in which they operate on light signals to separate the polarization vector of a light signal into polarization components and to operate on the polarization components in a particular manner is discussed in detail in U.S. Pat. Nos. 6,088,491 and 6,026,202, which are incorporated by reference herein in their entireties. Therefore, a detailed discussion of the manner in which these components can be implemented to perform the necessary operations will be understood by those skilled in the art in view of the discussion being provided herein.

The polarization vector of the light signal entering port $I_1$ from an optical fiber initially is not separated into separate orthogonal components, as indicated by the small cross in the block 21A. However, after the incoming light signal passes through WO1 31, the horizontal polarization component of the light signal is separated and displaced from the vertical polarization component in the walk-off direction, as indicated by block 21B. WO1 31 operates only on the polarization component of the light that is parallel to the walk-off direction of the WO1 31 (i.e., only on the horizontal polarization component, which is parallel to the walk-off direction indicated by the horizontal arrow in block 31). This separates and displaces the horizontally polarized component from the vertically polarized component. Thus, light having a polarization that is parallel to the walk-off direction of WO1 31 is separated into a beam by WO1 31 that has the same orientation as WO1 31. Light having a polarization that is not parallel to the walk-off direction of WO1 31 is not displaced, but forms a beam that is coincident with the original light beam and that has a polarization that is orthogonal to the polarization of the displaced beam.

These beams then pass through the compensation element 32, which does not change the polarization of the beams, but simply compensates for any light path length differences caused by the walk-off displacement. The light then passes through a first Faraday rotator F1 33, which changes the direction of polarization of each of the beams by 45°, as indicated by the lines in block 21D. The light then passes through a first half waveplate HWP1 34, which separately rotates the polarizations of each of the beams such that they both have a horizontal polarization, as indicated by block 21E. The dashed lines in the HWP1 component 34 indicate that each portion of the component operates on the polarized beams differently, which is also apparent from the notation in blocks 21E, 22D, 23E and 24D. Along input path $I_1$ 21, because the polarizations are horizontal, they will not be affected as they pass through the second walk-off element WO2 35, which has a vertical walk-off direction, as indicated by the vertical double-ended arrow in block 35.

It should be noted that light propagating along the $O_1$ 22 and $O_2$ 24 light paths in the reverse direction will be spatially displaced by WO2 35 because, as shown in blocks 22F, 22E, 24F and 24E, the light beams along these paths are vertically polarized at this point, as indicated by the vertical parallel lines in these blocks and the vertical displacement of those lines between blocks 22F and 22E and between blocks 24F and 24E. The shift in direction of the $O_1/O_2$ light paths with respect to the $I_1/I_2$ light paths can be seen in the directional stage 25 from the side view of the device 20 shown in FIG. 3B.

The light beams traveling along the $I_1$ light path 21 then pass through the second Faraday rotator F2 36, which rotates the polarizations of the beams by 45°, as shown in block 21G. F2 36 operates on light traveling along light paths $O_1$ and $O_2$ to rotate the polarizations such that they are vertical, as indicated by the lines in blocks 22G, 22F, 24G and 24F, which enables the $O_1$ and $O_2$ light path polarizations to be operated on by WO2 35 in order to direct those light paths in the direction indicated in the directional stage 25 shown in the side view of FIG. 3B.

The light beams traveling along $I_1$ then pass through HWP2, which rotates the polarizations of both beams into horizontal polarizations, as indicated by the lines in 21H. The light beams traveling along $I_1$ then passes through the polarization stage 26, which corresponds, in this example, to the WO3 block 38. The WO3 38 changes the direction of the light beams such that the beams corresponding to light path $I_1$ are displaced horizontally in the manner indicated in the polarization stage 26 shown in the top view of FIG. 3A. The horizontal displacement is indicated by the horizontal lines in block 21H and their movement from the left, upper corner of that block to the right, upper corner of block 21I.

When the polarization of the LC cell 30 is not rotated, the light beams corresponding to light path $I_1$ are reflected by the LC cell 30 such that they pass through WO3 38, which displaces the beams horizontally, as indicated by the shift in the lines in block 21I to those in block 22H. Therefore, in this case, the reflected light enters the $O_1$ light path and is operated on by the elements of the directional stage 25 in the manner indicated by the lines in blocks 22H–22A. It should be noted that, in the vertical planes, the $O_1$ light path tracks the $I_1$ light path, but is below it in the transverse planes due to WO2, as shown in the top view of FIG. 3A and as indicated by the shift in the vertical direction in correspondence with the lines in blocks 22F and 22E. It should also be noted that the WO1 31 combines the polarization components of the light traveling on light paths $O_1$ and $O_2$, respectively, as indicated by the lines in blocks 22B and 22A and 24B and 24A.

The different location of the cross in block 23A compared to that of the cross in block 21A indicates the horizontal separation of the beams on input light paths $I_1$ and $I_2$, which is evident from the top view of FIG. 3A. The horizontal polarization component is then separated from the vertical polarization component when the light passes through WO1

31, as indicated by the polarization notation lines in block 23B. The polarization changes indicated by the polarization notation in blocks 23B–23G are essentially the same as those indicated by blocks 21B–21G, respectively. Likewise, the polarization changes indicated by blocks 22G–22A are essentially the same as those indicated by blocks 24G–24A. Therefore, in the interest of brevity, the manner in which components 31–36 operate along all of the light paths will not be described.

However, HWP2 37 operates on the polarization components of light on light paths $I_2$ and $O_2$ in a manner different from the manner in which it operates on the polarization components of light on light path $I_1$ so that they are horizontal, whereas it rotates the polarization components of light on light path $I_2$ so that they are vertical, as indicated by blocks 21H and 23H, respectively. Because of this difference, when the polarization of the LC cell 30 is not rotated, light traveling along light path $I_2$ passes through WO3 38 unaffected, as indicated by block 23I. This light is reflected by the LC cell 30 without a change in polarization onto light path $O_2$, and passes back through WO3 38 unaffected, as indicated by block 24H. With this polarization, the reflected light can only enter light path $O_2$. Therefore, the reflected light then passes through the directional stage 25 along output light path $O_2$ and exits the integrated optical device 20 with the combined polarization indicated by block 24A so that the light is ready to be output onto an optical fiber.

When the LC cell 30 is fully rotated (i.e., rotated 90°), the light on light path $I_1$ having the polarization indicated by block 21I is operated on by WO3 38 such that it is directed into stage 25 towards $O_2$. Thus, the light from light path $I_1$ is reflected by the LC cell 30 onto light path $O_2$ The light having the polarization indicated by block 24H cannot be reflected by the LC cell 30 onto any other light paths due to the difference in polarization requirements of those other light paths. Similarly, the light on light path $I_2$ having the polarization indicated by block 23I is not operated on by block WO3, but is reflected by the LC cell 30 such that the reflected light has the polarization components indicated by the polarization notation in block 22H. Thus, in this state, the light from light path $I_2$ is reflected onto light path $O_1$, and the light from light path $I_1$ is reflected onto light path $O_2$.

As stated above, the integrated switch of the present invention can be used for protection switching, in add-drop modules and in many other applications, including all of those in which 2-by-2 switches have been used in the past as well future applications for which the switch of the present invention is suitable. In addition, due to the analog nature of the switch 20, which stems from the ability partially rotate the polarization of the LC cell 30, several applications are possible that cannot be implemented using digital, or binary, switches. However, the reflective element 30 of the optical device could be binary and still work for particular applications. For example, by using partial rotation of the LC cell 30, incoming light from, for example, port $I_1$, can be sent to both ports $O_1$ and $O_2$ for any desired fractions. The device of the present invention could therefore be used to provide drop-and-continue functionality. In this case, an optical data signal traveling along an optical fiber loop could be tapped at various locations, such as for the purpose of providing the signal to subscribers' premises, while enabling the optical data signal to continue along the optical fiber loop. This could be done by, for example, partially rotating the polarization of the LC cell 30 such that a fraction of the light would be reflected by the LC cell 30 onto optical path $O_2$ whereas most of the light would be reflected onto optical path $O_1$, which would be connected to the optical fiber loop. Optical path $O_2$ would correspond to the tapped off signal.

The device of the present invention could also be used as an attenuator. For example, by partially rotating the LC cell 30, a fraction of the light traveling along light path $I_1$ could be coupled onto light path $O_1$ and a fraction could be coupled onto light path $O_2$, which would then be dumped (i.e., discarded). The light on light path $O_2$ would correspond to an attenuated version of the light that entered light path $I_1$. The device of the present invention could also be used as a variable beam splitter, i.e., some fraction of light traveling on one of the input light paths could be coupled onto one of the output light paths and some fraction of light traveling on the same input light path could be coupled onto the other output light path. The fractions of light could be varied by varying the degree of rotation of polarization of the LC cell 30.

Input optics for focusing a fiber output onto the pigtailed ports 21–24, may include, for example, gradient-index (GRIN) lenses, micro-lenses or thermally expanded core (TEC) fibers. Those skilled in the art will understand that this can be accomplished in a variety of ways using a variety of optical components.

Another example embodiment of the optical device of the present invention will now be described with reference to FIGS. 6A–6C. FIG. 6A illustrates a configuration of various optical components and the manner in which they operate on the polarization components of light the goals described above with reference to FIG. 5. FIG. 6B illustrates a top view of the components shown in FIG. 6A and the manner in which the polarization components of input light and reflected light propagate through the optical device. FIG 6C illustrates a side view of the components shown in FIG. 6A and the manner in which the polarization components of input light and reflected light propagate through the optical device.

The optical device is comprised of a walk-off (W/OFF) element 41, a half waveplate (HWP) element 42, a walk-on (W/ON) element 43, a Faraday rotator 44, another HWP element 45, a walk-on (W/ON) element 46 and a reflective element 50 having a plurality of controllable states, which preferably is an LC cell. The block 51 illustrates four light beams, each of which has two polarization components that are orthogonally combined. Light beams 51 and 52 correspond to the $O_1$ and $I_1$ light paths, respectively, and light beams 53 and 54 correspond to the $I_2$ and $O_2$ light paths, respectively. For incoming light, the W/OFF element 41 displaces the horizontal polarization component 52A of beam 52, which corresponds to the $I_1$ input light, from its vertical component 52B. Likewise, the W/OFF element 41 displaces the horizontal polarization component 53A of beam 53, which corresponds to the $I_2$ input light, from its vertical component 53B. For outgoing light to be output from the optical device, the W/OFF element 41 combines the horizontal component 54A of beam 54, which corresponds to the output light path $O_2$, with its vertical component 54B. Likewise, the W/OFF element 41 combines the horizontal component 51A of beam 51, which corresponds to the output light path $O_1$, with its vertical component 51B. This separating and combining of the polarization components can be seen in block 41 of FIG. 6C.

The HWP 42 only operates on the separated polarization components in the right side of the box, namely, polarization components 51A, 52B, 53A and 54B. This can also be seen from block 42 in FIG. 6C in that only half of the polarization components propagate through the HWP 42. For the separated polarization components 52B and 53A of the incoming light, HWP 42 applies a clockwise 90° rotation, as indicated by the horizontal orientations of the dashes in the following box. With respect to the outgoing light, the polarization components 51A and 53A are also rotated clockwise by 90° as they pass through the HWP 42 propagating in the direction of the W/OFF element 41, as shown in the box proceeding the HWP 42. The W/OFF element 41 then orthogonally combines polarization components 51A and B and 54A and B to form two beams, each having two polarization components that are orthogonal to each other.

With respect to the input light, after the polarization components have been rotated by 90° in the clockwise direction, the input light passes through W/ON element 43. The input light polarization components 53A and B, which are now vertically polarized, are shifted upwards. This can be seen from the vertical incline of the $I_2$ input shown in block 43 FIG. 6B. The input light polarization components 52A and B of the $I_1$ input remain horizontally polarized and are not affected as they propagate through the W/ON element 43, as indicated by the straight $I_1$ line passing through block 43 in FIG. 6B. With respect to the output light, the W/ON element 43 shifts the polarization component 51A and B of the output light $O_1$ down, but leaves them vertically polarized. This shift can be seen by the upward incline in block 43 of FIG. 6B with respect to the direction of the output light. The polarization components 54A and B of the output light $O_2$ remain horizontally polarized and are not operated on by the W/ON element 43, as indicated by the $O_2$ line passing straight through block 43 in FIG. 6B.

The Faraday rotator 44 rotates the horizontally and vertically polarized input light polarization components 52A and B and 53A and B, respectively, by 45°. The HWP 45 then rotates the input light polarization components 53A and B and 52A and B clockwise by 45° such that the input light polarization components 52A and B are vertically polarized and the input light polarization components 53A and B are horizontally polarized. The W/ON element 46 then shifts the vertically polarized input light polarization components 52A and 52B down such that they are spatially coincident with and orthogonal to the horizontally polarized input light polarization components 53A and B, respectively. The downward shift of the vertically polarized input light polarization components 52A and 52B is indicated by the downward incline in block 46 of FIG. 6B with respect to the direction of propagation of the input light.

In the opposite direction, the vertically-polarized reflected light polarization components 51A and B are shifted down to separate them from the horizontally-polarized output light polarization components 54A and B. When the LC cell 50 is in a state in which polarization is not rotated, the spatially-separated vertically polarized input light polarization components 52A and B of input light $I_1$ will be reflected by the LC cell 50 with the same polarization, which is orthogonal to the polarizations of the input light polarization components 53A and B of the input light $I_2$, and to output light polarization components 54A and B of the output light $O_2$. Therefore, the reflected light from port $I_1$ will only propagate out of the optical device via the $O_1$ light path because that is the only light path that is capable of properly re-separating and re-combining the output light polarization components. Likewise, the reflected $I_2$ light, which is horizontally polarized, will only propagate out of the optical device via the $O_2$ light path because that is the only light path that is capable of properly re-separating and re-combining the output light polarization components.

On the other hand, if the LC cell 50 is in a state in which the polarization is rotated by 90°, the polarizations of all of the reflected light components will be rotated by 90°. Therefore, the vertically-polarized input light polarization components 52A and B of input light $I_1$ will be rotated by 90° such that these reflected light components will have a horizontal polarization. With this polarization, the polarization components will be properly re-separated and recombined if they propagate through and out of the optical device via optical path $O_2$. Likewise, the polarization of the horizontally-polarized input light polarization components 53A and B will rotated by 90° such that they will be vertically polarized. With this polarization, the polarization components will be properly re-separated and recombined if they propagate through and out of the optical device via optical path $O_1$. Therefore, rotating the angle of polarization of the LC cell 50 by 90° will enable the optical device to function as a 2-by-2 switch in the cross state (non-rotation of the LC cell 50 causes the optical device to function as a 2-by-2 switch in the bar state).

The optical device of FIG. 6A is capable of performing functions other than 2-by-2 switching, such as those described above with reference to FIG. 5 (e.g., variable attenuation, drop-and-continue functionality, variable beam splitting, etc.). The manner in which the optical device could be configured to perform such other functions has already been described above with reference to FIG. 5. Those skilled in the art will understand the manner in which the optical device of FIG. 6A could be configured to perform such other functions in view of the discussion provided herein.

It should be noted that although the example embodiments shown in FIGS. 5 and 6A each show two inputs and two outputs, the optical device of the present invention may have only one input and one output, two inputs and one output, or one input and two outputs, depending on the application of the optical device. Also, although spatially separated input paths and spatially separated output paths are shown, the optical device could be configured such that input and output light share a spatially-coincident path, with the output light polarization components being combined by an element (not shown) outside of the optical device. Similarly, spatial separation of the input light polarization components could occur before the input light is input to the optical device.

Those skilled in the art will understand the many possible applications of the present invention in view of the discussion provided herein. Of course, orientations of waveplates and crystals other than those shown in FIGS. 5 and 6A can be used to accomplish the goals of the present invention in an integrated form, as will be understood by those skilled in the art in view of the discussion being provided herein. Also, the present invention is not limited to the materials discussed herein for creating the components of the integrated optical device of the present invention. For example, as stated above, the reflective element of the present invention can be something other than a liquid crystal cell, and it can be something known now or discovered or developed in the future.

It should be noted that the above-described embodiments of the present invention are examples of implementations. Those skilled in the art will understand from the disclosure provided herein that many variations and modifications may be made to the embodiments described without departing from the scope of the present invention. All such modifications and variations are within the scope of the present invention.

What is claimed is:

1. A optical device, comprising:
a polarization-controlling reflector, said reflector converting incident-light polarization components having incident angles of polarization into reflected-light polarization components having reflected angles of polarization, said reflector having a plurality of states, and being controllable such that said reflector can be changed from one of said plurality of states to another of said plurality of states, said reflected angles of polarization having an orientation relative to said incident angles of polarization, said orientation being a function of the state of the reflector; and
a polarization-dependent optical-path device, said polarization-dependent optical-path device converting input-light polarization components that are at least partially spatially-coincident and that have been coupled into the optical device into spatially-separated input-light polarization components, said polarization-dependent optical-path device converting said spatially-separated input-light polarization components into said incident-light polarization components, and wherein when said reflector is in a first one of said plurality of states, said orientation is such that said polarization-dependent optical-path device causes at least a portion of the reflected-light polarization components to be out-coupled from the optical device,
wherein said polarization-dependent optical-path device includes an input polarization-dependent path splitting element and an output polarization-dependent path splitting element, the input polarization-dependent path splitting element converting said input-light polarization components that are at least partially spatially-coincident into said spatially-separated input-light polarization components, thereby defining a branched input, and wherein prior to said polarization-dependent optical-path device converting said spatially-separated reflected-light polarization components having reflected angles of polarization into said output-light polarization components that are at least partially spatially-coincident, said output polarization-dependent path splitting element converts said spatially-separated reflected light components having reflected angles of polarization into spatially-separated reflected-light components having output angles of polarization, thereby defining a branched output, said output angles of polarization depending on the state of the reflector, wherein when said reflector is in said first one of said plurality of states, at least a portion of said output-light polarization components is out-coupled from the optical device through said branched output, and wherein the portion of said output-light polarization components that is out-coupled from the optical device through said branched output depends on the state of said reflector.

2. The optical device of claim 1, wherein when said reflector is in a second one of said plurality of states, at least a portion of said output-light polarization components is out-coupled from the optical device through said branched output and at least a portion of said output-light polarization components is out-coupled from the optical device through said branched input, and wherein the portion of said output-light polarization components that is out-coupled from the optical device through said branched output and the portion of said output-light polarization components that is out-coupled from the optical device through said branched input depends on the state of said reflector.

3. The optical device of claim 1, wherein said plurality of states constitutes a continuum of states such that said optical device functions as an analog optical device, and wherein the respective portions of output-light polarization components that are out-coupled from the optical device through said branched input and through said branched output is controllably variable over a continuum of said portions by selecting the state of the reflector from said continuum of states.

4. The optical device of claim 1, wherein said polarization-dependent optical path device includes a polarization-dependent combiner element, and wherein after said output polarization-dependent path splitting element converts said spatially-separated reflected light components having reflected angles of polarization into spatially-separated reflected-light components having output angles of polarization, the polarization-dependent combiner converts said spatially-separated reflected-light polarization components having output angles of polarization into said output-light polarization components that are at least partially spatially-coincident.

5. The optical device of claim 1, wherein said polarization-dependent optical path device includes a polarization-dependent combiner element, and wherein after said output polarization-dependent path splitting element converts said spatially-separated reflected light components having reflected angles of polarization into spatially-separated reflected-light components having output angles of polarization, the polarization-dependent combiner converts said spatially-separated reflected-light polarization components having output angles of polarization into output-light polarization components that are orthogonal to each other.

6. The optical device of claim 1, wherein when said reflector is in a third one of said plurality of states, the optical device functions as a beam splitter and approximately half of the output-light polarization components are out-coupled from the optical device through said branched output and approximately half of the output-light polarization components are out-coupled from the optical device through said branched input.

7. The optical device of claim 1, wherein the input-light polarization components coupled into the optical device and the reflected-light polarization components out-coupled from the optical device at least partially share a common optical path within the optical device.

8. The optical device of claim 1, wherein the input-light polarization components coupled into the optical device propagate along at least one input optical path of the optical device and the reflected-light polarization components are out-coupled from the optical device via at least one output optical path of the optical device, the at least one output optical path being distinct from the at least one input optical path.

9. An optical device comprising:
a polarization-controlling reflector, said reflector converting a first set of spatially-separated incident-light polarization components having incident angles of polarization into a first set of spatially-separated reflected-light polarization components having reflected angles of polarization and converting a second set of spatially-separated incident-light polarization components having incident angles of polarization into a second set of spatially-separated reflected-light polarization components having reflected angles of polarization, the incident angles of polarization of said first set of incident-light polarization components being different from the incident angles of polarization of said second set of incident-light polarization components, the reflected angles of polarization of said first set of spatially-separated reflected-light polarization components being different from the reflected angles of polarization of said second set of spatially-separated reflected-light polarization components, said reflector having a plurality of states and being controllable such that said reflector can be changed from one of said plurality of states to another of said plurality of states, the reflected angles of polarization having orientations relative to their respective incident angles of polarization, said orientations being a function of the state of the reflector; and a polarization-dependent optical-path device having at least a first input port, a first output port, a second input port and a second output port, said polarization-dependent optical-path device converting a first set of input-light polarization components that are at least partially spatially-coincident and that have been coupled into the first input port of the optical device into a first set of spatially-separated input-light polarization components and converting a second set of input-light polarization components that are at least partially spatially-coincident and that have been coupled into the second input port of the optical device into a second set of spatially-separated input-light polarization components, said polarization-dependent optical-path device converting said first set of spatially-separated input-light polarization components into said first set of spatially-separated incident-light polarization components and converting said second set of spatially-separated input-light polarization components into said second set of spatially-separated incident-light polarization components, and wherein when said reflector is in a first one of said plurality of states, said orientation is such that said polarization-dependent optical-path device causes at least a portion of said first set of reflected-light polarization components to be out-coupled from the optical device through said first output port, wherein when said reflector is in said first one of said plurality of states, said orientation is such that said polarization-dependent optical-path device causes at least a portion of said second set of reflected-light polarization components to be out-coupled from the optical device through said second output port, and wherein when said reflector is in a second one of said plurality of states, said orientation is such that said polarization-dependent optical-path device causes at least a portion of said first set of reflected-light polarization components to be out-coupled from the optical device through said second output port.

10. The optical device of claim 9, wherein when said reflector is in a second one of said plurality of states, said orientation is such that said polarization-dependent optical-path device causes at least a portion of said second set of reflected-light polarization components to be out-coupled from the optical device through said first output port.

11. The optical device of claim 9, wherein said polarization-dependent optical-path device includes an input polarization-dependent path splitting element, the input polarization-dependent path splitting element converting said first set of input-light polarization components that are at least partially spatially-coincident into said first set of spatially-separated input-light polarization components and converting said second set of input-light polarization components that are at least partially spatially-coincident into second set of spatially-separated input-light polarization components, said first and second sets of said spatially-separated input-light polarization components propagating along a common optical path of the optical device from the first input port.

12. The optical device of claim 9, wherein said polarization-dependent optical-path device includes an input polarization-dependent path splitting element, the input polarization-dependent path splitting element converting said first set of input-light polarization components that are at least partially spatially-coincident into said first set of spatially-separated input-light polarization components and converting said second set of input-light polarization components that are at least partially spatially-coincident into said second set of spatially-separated input-light polarization components propagating along a first optical path of the optical device from the first input port and said second set of said spatially-separated input-light polarization components propagating along a second optical path of the optical device from the first input port, the first optical path being distinct from the second optical path.

13. The optical device of claim 9, wherein said polarization-dependent optical-path device includes an output polarization-dependent path splitting element, and wherein prior to said polarization-dependent optical-path device converting said first and second sets of spatially-separated reflected-light polarization components into said first and second sets, respectively, of output-light polarization components that are at least partially spatially-coincident, said output polarization-dependent path splitting element converts said first set of spatially-separated incident-light components having incident angles of polarization into a first set of spatially-separated reflected-light components having reflected angles of polarization that are different from said incident angles of polarization of said first set of spatially-separated incident-light components, and converts said second set of spatially-separated incident-light components having incident angles of polarization into a second set of spatially-separated reflected-light components having reflected angles of polarization that are different from said incident angles of polarization of said second set of spatially-separated incident-light components, said reflected angles of polarization of said first and second sets of spatially-separated reflected-light polarization components depending on said state of the reflector, wherein when said reflector is in said first one of said plurality of states, at least a portion of said first set of output-light polarization components is out-coupled from the optical device through said first output port.

14. The optical device of claim 13, wherein when said reflector is in said first one of said plurality of states, said orientation is such that said polarization-dependent optical-path device causes at least a portion of said second set of output-light polarization components to be out-coupled from the optical device through said second output port.

15. The optical device of claim 14, wherein when said reflector is in a second one of said plurality of states, said orientation is such that said polarization-dependent optical-path device causes at least a portion of said first set of output-light polarization components to be out-coupled from the optical device through said second output port.

16. The optical device of claim 14, wherein when said reflector is in a second one of said plurality of states, said orientation is such that said polarization-dependent optical-path device causes at least a portion of said second set of output-light polarization components to be out-coupled from the optical device through said first output port.

17. An integrated optical device comprising:
at least a first input port;
at least first and second output ports;
a substantially non-reciprocal directional stage comprising one or more elements that are configured to operate on polarization components of light, the directional stage receiving light from at least the first input port, the received light having polarization components, the directional stage controlling a path of propagation of the received light through the directional stage by operating on the polarization components of the received light;
a reflective element having a plurality of states such that light impinging on the reflective element is reflected by the reflective element with a polarization that depends on the State of the reflective element; and
a polarization Stage interposed between the directional stage and the reflective element, the polarization stage directing the polarization components of light propagating through the directional stage onto the reflective element by operating on the polarization components of the light received by the polarization stage from the directional stage, and wherein the polarization stage directs light components reflected from the reflective element into the directional stage with a polarization that depends on the state of the reflective element to enable the directional stage to control the path of propagation of the reflected light based on the polarization of the reflected light components,
wherein when the reflective element is in a first one of said plurality of states, at least a fraction of the reflected light is out-coupled from the integrated optical device through the first output port and at least substantially none of the reflected light is output from the integrated optical device through the first input port, and wherein when the reflective element is in a second one of said plurality of states, at least a fraction of the reflected light is out-coupled from the integrated optical device through the second output port and at least substantially none of the reflected light is output from the integrated optical device through the first input and first output ports.

18. The integrated optical element of claim 17, further comprising a second input port, wherein light received by said substantially non-reciprocal directional stage from the second input port has polarization components, the directional stage controlling the path of propagation of the light received from the second input port through the directional stage by operating on the polarization components of the light received through the second input port, and wherein the light received through the second input port is reflected by the reflective element with a polarization that depends on the state of the reflective element, and wherein when the reflective element is in a second one of said plurality of states, at least a fraction of the reflected light corresponding to light received through the first input port is out-coupled from the integrated optical device through the second output port and at least a fraction of the light received through the second input port is out-coupled through the first output port.

19. The integrated optical device of claim 17, wherein the directional stage comprises one or more walk-off crystals and one or more Faraday rotators for manipulating the polarization components of the light received through the first input port.

20. The integrated optical device of claim 17, wherein the polarization stage comprises at least one birefringent element that directs polarization components of light received from the directional stage onto the reflective element in a manner dictated by the polarization components of the received light and by a configuration of said at least one birefringent element, and wherein the polarization stage directs light reflected from the reflective element into the directional stage in a manner dictated by the polarization components of the reflected light and by the configuration of said at least one birefringent element, thereby causing the polarization stage to function as a polarizing beam splitter that directs reflected light into an appropriate side of the directional stage.

21. The integrated optical device of claim 17, wherein the reflective element is a liquid crystal cell.

22. A method for operating on light, the method comprising:
providing an optical device comprising a polarization-dependent optical path device and a controllable reflective element that has a plurality of states, said polarization-dependent optical-path device including an input polarization-dependent path splitting element, the input polarization-dependent path splitting element spatially separating said input-light polarization components to obtain said spatially-separated input-light polarization components, thereby defining a branched input;
coupling input light into the optical device;
using the polarizing-dependent optical path device to separate the input light into spatially-separated input-light polarization components;
using the polarization-dependent optical path device to provide the polarization components with incident angles of polarization and to direct the polarization components onto the reflective element;
placing the reflective element in one of said plurality of states, wherein the reflective element reflects the input-light polarization components incident thereon, thereby producing reflected-light polarization components having reflected angles of polarization, the reflected angles of polarization depending on the state of the reflective element; and
using the polarization-dependent optical path device to combine the reflected-light polarization component, the combined reflected-light polarization components being out-coupled from the optical device,
wherein said polarization-dependent optical-path device includes an output polarization-dependent path splitting element, said output polarization-dependent path splitting element converting said reflected-light polarization components having reflected angles of polarization into spatially-separated reflected-light polarization components having reflected angles of polarization, thereby defining a branched output, said reflected angles depending on the state of the reflective element, wherein when said reflector is in a first one of said plurality of states, at least a portion of said combined reflected-light polarization components is out-coupled from the optical device through said branched output, and wherein the portion of the out-coupled light components that is out-coupled from the optical device through said branched output depends on the state of said reflector.

23. The method of claim 22, wherein when said reflective element is in a second one of said plurality of states, at least a portion of the combined reflected-light polarization components is out-coupled from the optical device through said branched output and at least a portion of said output-light polarization components is out-coupled from the optical device through said branched input, and wherein the portion of the polarization components that is out-coupled from the optical device through said branched output and the portion of the polarization components that is out-coupled from the optical device through said branched input depends on the state of said reflective element.

24. The method of claim 22, wherein said plurality of states constitute a continuum of states such that said optical device functions as an analog optical device, and wherein the respective portions of polarization components that are out-coupled from the optical device through said branched input and through said branched output are variable over a continuum of said portions by controllably selecting the state of the reflective element from said continuum of states.

* * * * *